United States Patent
Ren et al.

(10) Patent No.: US 7,924,749 B2
(45) Date of Patent: Apr. 12, 2011

(54) IDENTIFICATION OF LONG LINKS WITHIN A WIRELESS NETWORK

(75) Inventors: Wenge Ren, Sunnyvale, CA (US); Frederick Dean, Wilmette, IL (US); Cyrus Behroozi, Menlo Park, CA (US)

(73) Assignee: Tropos Networks, Inc., Sunnyvale, CA (US)

(*) Notice: Subject to any disclaimer, the term of this patent is extended or adjusted under 35 U.S.C. 154(b) by 437 days.

(21) Appl. No.: 11/796,986

(22) Filed: Apr. 30, 2007

(65) Prior Publication Data
US 2008/0267141 A1    Oct. 30, 2008

(51) Int. Cl.
*H04L 12/56* (2006.01)
*H04J 1/16* (2006.01)

(52) U.S. Cl. ......... 370/278; 370/252; 370/329; 714/749

(58) Field of Classification Search .......... 370/252, 370/329, 278; 714/749
See application file for complete search history.

(56) References Cited

U.S. PATENT DOCUMENTS

| | | | |
|---|---|---|---|
| 6,526,034 B1 | 2/2003 | Gorsuch | |
| 6,965,575 B2* | 11/2005 | Srikrishna et al. | 370/252 |
| 7,020,439 B2 | 3/2006 | Sinivaara et al. | |
| 2002/0045435 A1* | 4/2002 | Fantaske | 455/403 |
| 2004/0003286 A1* | 1/2004 | Kaler et al. | 713/201 |
| 2004/0202141 A1 | 10/2004 | Sinivaara et al. | |
| 2005/0185632 A1 | 8/2005 | Draves et al. | |
| 2005/0239414 A1* | 10/2005 | Mason et al. | 455/69 |
| 2006/0291389 A1* | 12/2006 | Attar et al. | 370/230 |
| 2007/0249331 A1* | 10/2007 | Sinivaara et al. | 455/418 |
| 2008/0261535 A1* | 10/2008 | Weil et al. | 455/67.11 |

* cited by examiner

*Primary Examiner* — John Pezzlo
(74) *Attorney, Agent, or Firm* — Brian R. Short

(57) ABSTRACT

An apparatus and method of identifying long links within a wireless network is disclosed. The method includes identifying long links within a wireless network. The method includes a first node estimating a link quality of a wireless link between the first node and a second node of the wireless network. The first node uni-casts packets to the second node. The first node monitors a packet acknowledgment success rate. The first node identifies the wireless link to be a long link if the link quality is above a link threshold, and the packet acknowledgment success rate is below an acknowledgment threshold.

21 Claims, 5 Drawing Sheets

IDENTIFICATION OF LONG LINKS WITHIN A WIRELESS NETWORK

FIELD OF THE DESCRIBED EMBODIMENTS

The described embodiments relate generally to wireless communications. More particularly, the described embodiments relate to identifying long links within a wireless network.

BACKGROUND

Wireless mesh networks are gaining popularity because wireless infrastructures are typically easier and less expensive to deploy than wired networks. The wireless mesh networks typically include wired gateways that are wirelessly connected to wireless nodes, or wirelessly connected directly to client devices. Many wireless nodes can collectively provide a wireless mesh, in which client devices can associate with any of the wireless nodes.

Routing paths can be selected between the nodes of the mesh network according to one or more of many possible routing selection procedures. The routing paths provide a path for data flow between a client device associated with the wireless mesh network and a gateway of the mesh network. The gateway can be wire-connected to a wired network which is connected, for example, to the Internet. Due to the possibility of changing locations of the wireless nodes, and due to the typically changing link qualities of wireless connections, the best quality routing path available can vary with time.

Due to the environmental conditions that wireless mesh networks are subject to, and the possibility of changing node locations, the wireless links between the wireless nodes of wireless mesh networks are susceptible to being excessively long. Excessively long links can cause excessive latency of data propagating through the links.

It is desirable to have a method and apparatus for operating wireless networks that can include long wireless links.

SUMMARY

An embodiment includes a method of identifying long links within a wireless network. The method includes a first node estimating a link quality of a wireless link between the first node and a second node of the wireless network. The first node uni-casts packets to the second node. The first node monitors a packet acknowledgment success rate. The first node identifies the wireless link to be a long link if the link quality is above a link threshold, and the packet acknowledgment success rate is below an acknowledgment threshold.

Another embodiment includes a method of identifying long links within a wireless network. The method includes a first node estimating a link quality of a wireless link between the first node and a second node of the wireless network. The first node uni-casts packets to the second node. The first node monitors a uni-cast packet retry counter. The first node identifies the wireless link to be a long link if the link quality is above a link threshold, and the packet retry counter is above a counter threshold.

Another embodiment includes a method of identifying long links within a wireless mesh network. For a wireless mesh network, the first node is typically a downstream node, and the second node is an upstream node of the wireless mesh network.

Other aspects and advantages of the described embodiments will become apparent from the following detailed description, taken in conjunction with the accompanying drawings, illustrating by way of example the principles of the described embodiments.

DETAILED DESCRIPTION

Figure 1:
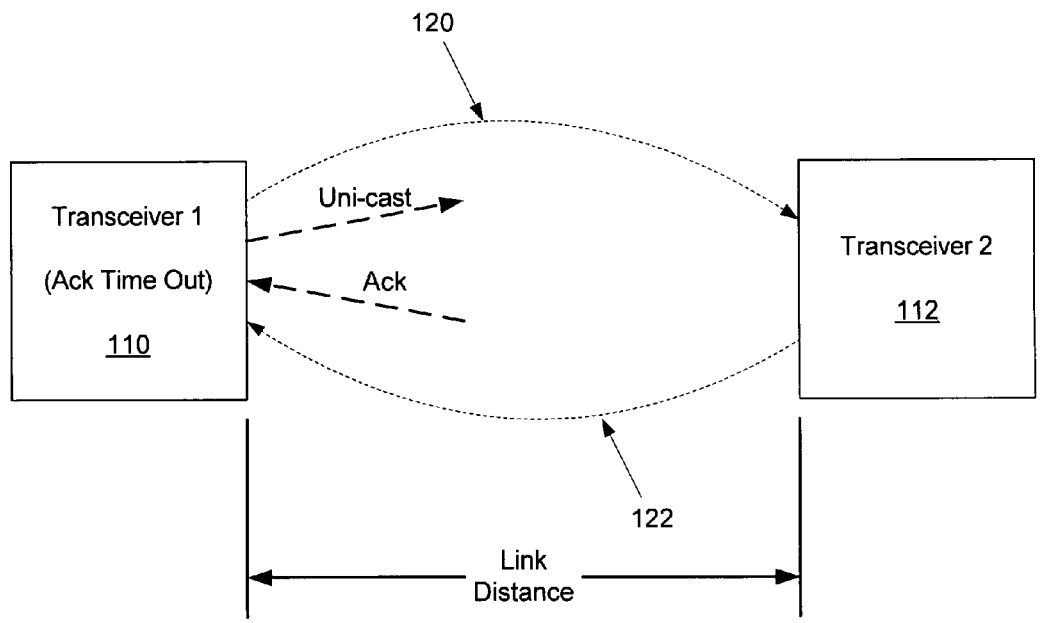
FIG. 1 shows a first transceiver and a second transceiver that are wirelessly connected through a long wireless link.

As shown in the drawings for purposes of illustration, the described embodiments are embodied in an apparatus and method for identifying long links within a wireless network. Once identified, the long links can be preferentially avoided.

As will be described, wireless link qualities can be determined using methods (such as, broadcasting of beacons or routing packets) that are insensitive to the length of the wireless links, and therefore, the time of flight of signals transmitted through the wireless links. If a wireless link is established based on a time insensitive link quality measurement, then data packets that are transmitted, for example, according to an IEEE 802.11 protocol, may fail due to uni-cast data packets timing out. That is, if the transmission time of the data packets is too large, the uni-cast data transmissions will continuously timeout because of excessively delayed acknowledgments, and can result in an otherwise high-quality link being unusable. This timeout problem can be addressed to some extent by increasing the timeout value. However, this can be an undesirable solution if it creates an unnecessary burden on other parts of the wireless network.

FIG. 1 shows a first transceiver 110 and a second transceiver 112 that are wirelessly connected through a wireless link. The wireless link includes a first direction link 120 and a second direction link 122. The time required for a transmission signal to propagate from the first transceiver 110 to the second transceiver 112 is directly dependent upon the distance between the first transceiver 110 and the second transceiver 112. If the link distance (distance between the transceivers) is long enough, the link is designated a long link.

One embodiment of the first transceiver 110, uni-casts packets to the second transceiver 112. The first transceiver 110 then monitors the time required to receive an acknowledgment (Ack) for each of the uni-cast packets. For this embodiment, the transceiver 110 includes an acknowledgment timer that times out if an acknowledgment to a uni-cast packet is not received within a predetermined timeout period. The timeout period typically is typically set to a default value that can be adjusted.

The acknowledgment timeout expires if an acknowledgment is never received, or if the acknowledgment is received after the timeout period. In some applications, the fact that the timeout period has expired, can be used as an indicator that the link is poor. However, if another method of determining link quality is available, a long link can be detected by determining that the link is of good quality (using the other method to detect link quality), and by detecting that the timeout period is expiring before an acknowledgment is received. If the quality of the link is determined to be good, it can be assumed that the timeout period is expiring because the time required for the uni-cast packets to travel over the link, plus the time required for the acknowledgment to travel back across the link is longer than the timeout period, indicating that the wireless link is long.

One example of a timeout period is 48 microseconds. Assuming an electromagnetic wave propagation speed of $3\times10^8$ meters per second, a 2.5 mile link requires approximately 25 microseconds of round trip propagation time. Therefore, when including the time required for the second transceiver to receive the uni-cast packet, and respond with an acknowledgment, a 2.5 mile link is likely to cause the 48 microsecond timeout period to expire.

One method of determining link quality includes measuring a persistence of packets that are successfully received at, for example, the second transceiver 112. That is, if packets are transmitted from the first transceiver 110 at a predetermined rate, the quality of the wireless link between the first transceiver 110 and the second transceiver 112 can be estimated by calculating the persistence of the packets successfully received at the second transceiver 112. Once the second transceiver 112 has estimated the quality of the link, the second transceiver can feed the quality back to the first transceiver 110, providing a closed-loop estimate of the link quality.

The quality of the link between the first transceiver 110 and the second transceiver 112 can also be estimated by calculating a persistence of packets received at the first transceiver 110. That is, if packets are transmitted from the second transceiver 112 at a predetermined rate, the quality of the link between the first transceiver 110 and the second transceiver 112 can be estimated by calculating the persistence of the packets successfully received at the first transceiver 110.

Another method of determining the link quality includes measuring a persistence of acknowledgment packets, providing an open-loop estimate of the link quality. Note, however, that this can be more difficult if the timeout period is expiring. The timeout period can be increased to allow the persistence of the acknowledgment packets to be determined. The persistence of the acknowledgment packets provides a link quality estimate, but does not provide an estimate of link quality in a particular direction. That is, if the persistence of the acknowledgments is low, it can not be determined if packets are being lost in the first direction 120 or the second direction 122.

As previously suggested, if the link quality is determined to be of high-quality, and the timeout period (at least the default timeout value) of acknowledgments is expiring, a wireless link can be designated as a long link. A long link may be desirable to avoid because of the additional latency associated with long links.

Figure 2:
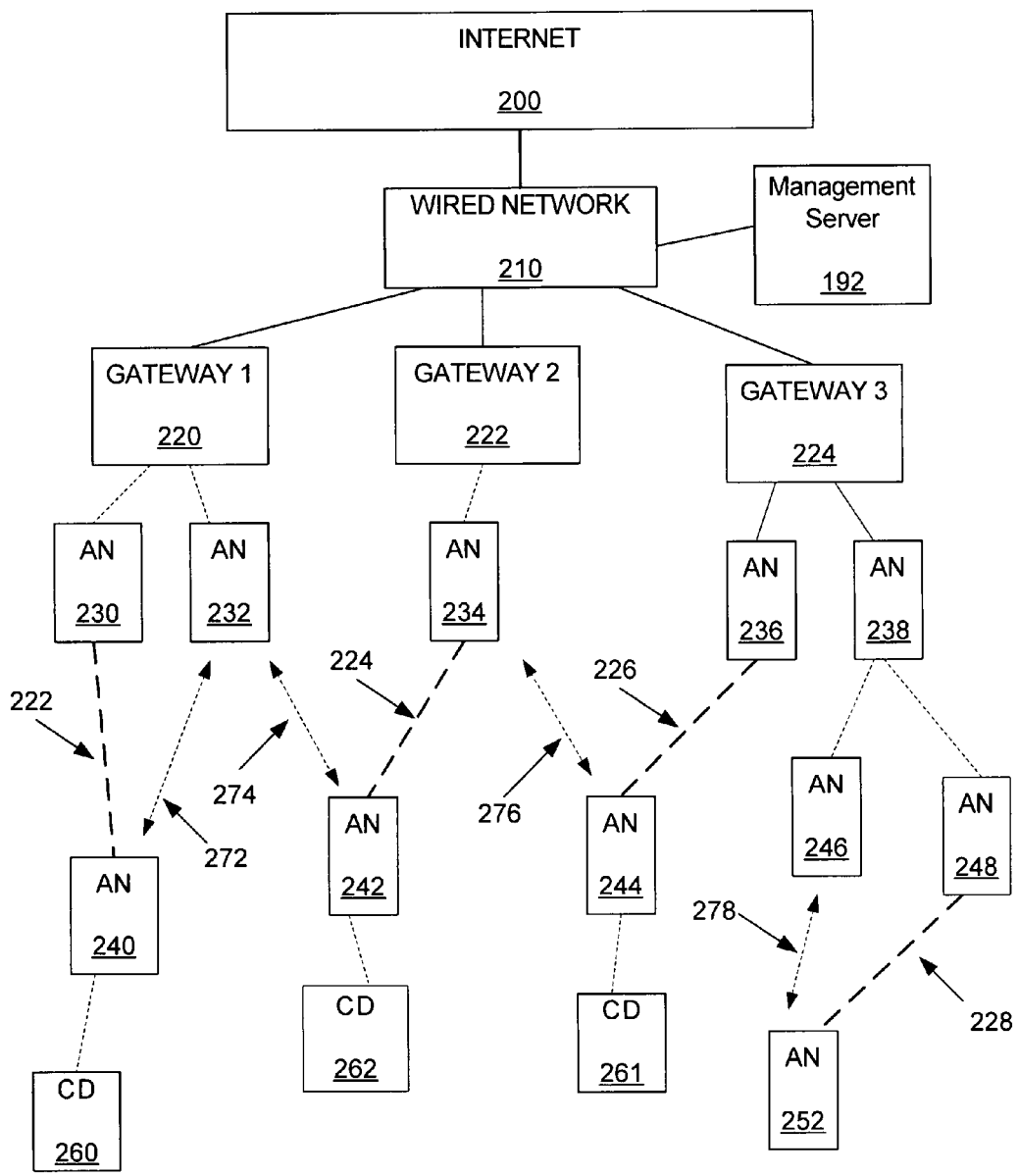
FIG. 2 shows an example of a wireless mesh network that includes long links between some of the access nodes of the wireless mesh network.

FIG. 2 shows an example of a wireless mesh network that includes long links between some of the access nodes of the wireless mesh network. The wireless mesh network includes gateways 220, 222, 224 that are wire or wirelessly connected to a wire network 210. The wired network 210 can be connected, for example, to the Internet 200.

The wireless mesh network additionally includes first order (one wireless hop away from a gateway) access nodes 230, 232, 234, 236, 238, second order access nodes 240, 242, 244, 246, 248 (two wireless hops away from a gateway) and a third-order access node 252. Client devices, such as, client devices 260, 261, 262 can wirelessly connect to any of the gateways or access nodes of the wireless mesh network, thereby obtaining a wireless connection to the Internet 200. It is to be understood that the wireless mesh network can include any number of gateways and access nodes, and the order (number of wireless hops away from a gateway) is not limited.

Within the wireless mesh network, it is useful to identify wireless links that are greater than a threshold distance. Wireless links that are identified to be longer than the threshold distance can be identified as "long links" and considered when selecting routing paths through the wireless mesh network. Long links require longer transmission times, and can add excessive latency to routing paths of the wireless mesh network.

The wireless links of the wireless mesh network can be implemented using 802.11 protocol circuitry. This wireless protocol includes an acknowledgment timeout period as previously described. Uni-cast packets are transmitted from a first wireless node (access node or gateway) to a second wireless node. The first wireless node includes an acknowledgment timeout counter that times out (expires) if an acknowledgment to a uni-cast packet is not received within the timeout period. The lack of reception of an acknowledgment provides an indication that the uni-cast packet was not received by the second access node. Therefore, typically the uni-cast packet is re-sent (also referred to as a retry) as many as 16-32 times. However, if the wireless link between the first wireless node and the second wireless node is too long, the timeout counter will continuously exceed its timeout value, whether of not the uni-cast packet is successfully received, and the acknowledgment is successfully transmitted and received.

As previously mentioned, if an alternate method for determining the link quality is available, links that are long (as reflected by expiration of the timeout value) can be distinguished from poor quality links. Clearly, poor quality links should be avoided if possible. Long links can be avoided, or preferentially avoided depending upon the routing selection protocol.

For an embodiment, the access nodes of the wireless mesh network select routing paths based at least in part, on routing beacons that originate at the gateways. The routing selection metrics can include, but are not limited to, routing beacons persistence, reverse link routing beacon persistence and hop count. The routing metrics can additionally include information regarding long links, wherein long links are avoided, or preferentially not selected within a routing path.

The gateways 220, 222, 224 broadcast routing packets (beacons), which can be used to determine routing between access nodes 230-252 and gateways 220, 222 of the network. The beacons are received by all first-level access nodes (for example, access nodes 230, 232, 234, 236, 238), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway.

The first level access nodes 230, 232, 234, 236, 238 include upstream links, and downstream links to the gateways 220, 222, 224. The quality of a downstream link can be different than the quality of the corresponding upstream link. Link asymmetries can arise because of differences in transmit power levels at each end of the link, or due to environmental effects or signal interference.

The asymmetrical characteristics of the links between access nodes and the gateways can lead to non-optimal routing selections if, for example, the quality of the upstream links is not included in routing decisions by access nodes to gateways. Each gateway and access node transmits beacons. All access nodes and gateways that receive the beacons can make an estimate of the quality of the link based upon the reception of the beacons. The estimates can include both upstream link quality and downstream link quality. Once each access node has the upstream and downstream link qualities within every possible data path to a gateway, the access node can make a selection of the best available data path.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 2 also includes a second level access nodes 240, 242, 244, 246, 248. The second level access nodes 240, 242, 244, 246, 248 receive routing beacons from first level access nodes. The second level access nodes select routing paths through first-level access nodes based at least to some extent, based on the routing beacons rebroadcast by the first-level access nodes. The routing selection metrics can be similar to the routing selection metrics of the first-order access nodes. More specifically, the routing selection metrics can include, but are not limited to, routing beacons persistence, reverse link routing beacon persistence and hop count. The routing metrics can additionally include information regarding long links, wherein long links are avoided, or preferentially not selected within a routing path.

As previously described, long links can be identified within the wireless mesh network by detecting acknowledgment timeouts for links that are otherwise determined to be good quality links. For example, links 222, 224, 226, 228 could be determined to be quality links by detecting a high-persistence of successfully received routing packets at the access nodes 240, 242, 244, 252. However, the acknowledgments of the access nodes 240, 242, 244, 252 may be timing out. The combination of detecting high-quality links and timing out of acknowledgments can be used to deduce that the links 222, 224, 226, 228 are long links.

Once links have been determined to be long links, this information can be used to aid routing selections through the wireless network. For example, the routing selections can be based on the routing beacon persistence, reverse link persistence, hop count and identification of long links. That is, for example, access node 240 may alternatively select a route through the access node 232 through the link 272 if the link 222 to the access node 230 is determined to be a long link. The access node 242 may alternatively select a route through the access node 232 through the link 274 if the link 224 to the access node 234 is determined to be a long link. The access node 244 may alternatively select a route through the access node 234 through the link 276 if the link 226 to the access node 236 is determined to be a long link. The access node 252 may alternatively select a route through the access node 246 through the link 278 if the link 228 to the access node 248 is determined to be a long link.

Figure 3:
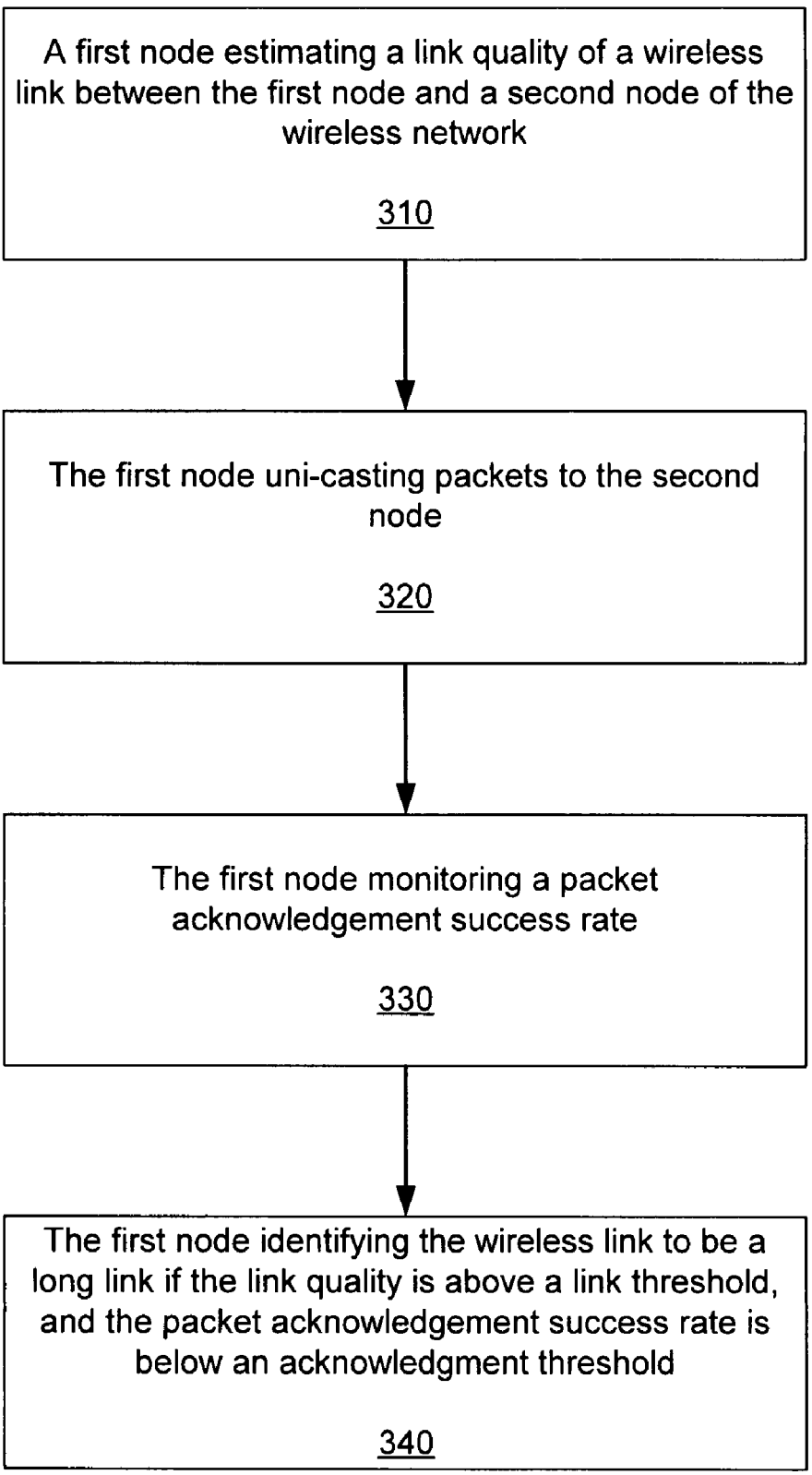
FIG. 3 is a flow chart that includes steps of one example of a method of identifying long links within a wireless network

FIG. 3 is a flow chart that includes steps of one example of a method of identifying long links within a wireless network. A first step 310 of the method includes a first node estimating a link quality of a wireless link between the first node and a second node of the wireless network. A second step 320 includes the first node uni-casting packets to the second node. A third step 330 includes the first node monitoring a packet acknowledgment success rate. A fourth step 340 includes the first node identifying the wireless link to be a long link if the link quality is above a link threshold, and the packet acknowledgment success rate is below an acknowledgment threshold.

As previously mentioned, in some situations the latency of a long link may make a wireless connection through the long link less desirable than alternative wireless links. That is, the first node may avoid a wireless connection with the second node if the wireless link is identified as a long link. Alternatively, the first node preferentially selects a wireless connection to the wireless network through a wireless link that is not designated as a long link.

For a wireless mesh network, the first node is a downstream device, and the second node is an upstream node. The upstream node can be either a gateway or another access node. The first node selects a routing path to a gateway of the wireless mesh network by analyzing link qualities of upstream links. Example of link qualities that can be used to select the routing path include downstream routing packet success rate, upstream packet success rate and whether the upstream link is designated as a long link.

If a link is identified as a long link, then the first node can dynamically increases an acknowledgment timeout value. Additionally, the first node can notify the second node to increase the acknowledgment timeout value.

Another embodiment can include decreasing the acknowledgment timeout value. Decreasing the acknowledgment timeout value can be used to estimate the length of a link. Typically, the timeout value is set to a default value. If the wireless link is operating without timing out, then the length of the link is unknown. By decreasing the value of the timeout until the link begins to timeout, an estimate of the length of the wireless link can be made.

For an embodiment, dynamically increasing the acknowledgment timeout value includes increasing the timeout value and monitoring the resulting packet acknowledgment success rate. If the packet acknowledgment success rate remains below the acknowledgment threshold the timeout value can be additionally increased. A predetermined timeout value cap can be selected in which the time out value cannot exceed. If the timeout value cap is exceeded, then the wireless link is identified as a long link, and the acknowledgment timeout value is reset back to a default value.

Figure 4:
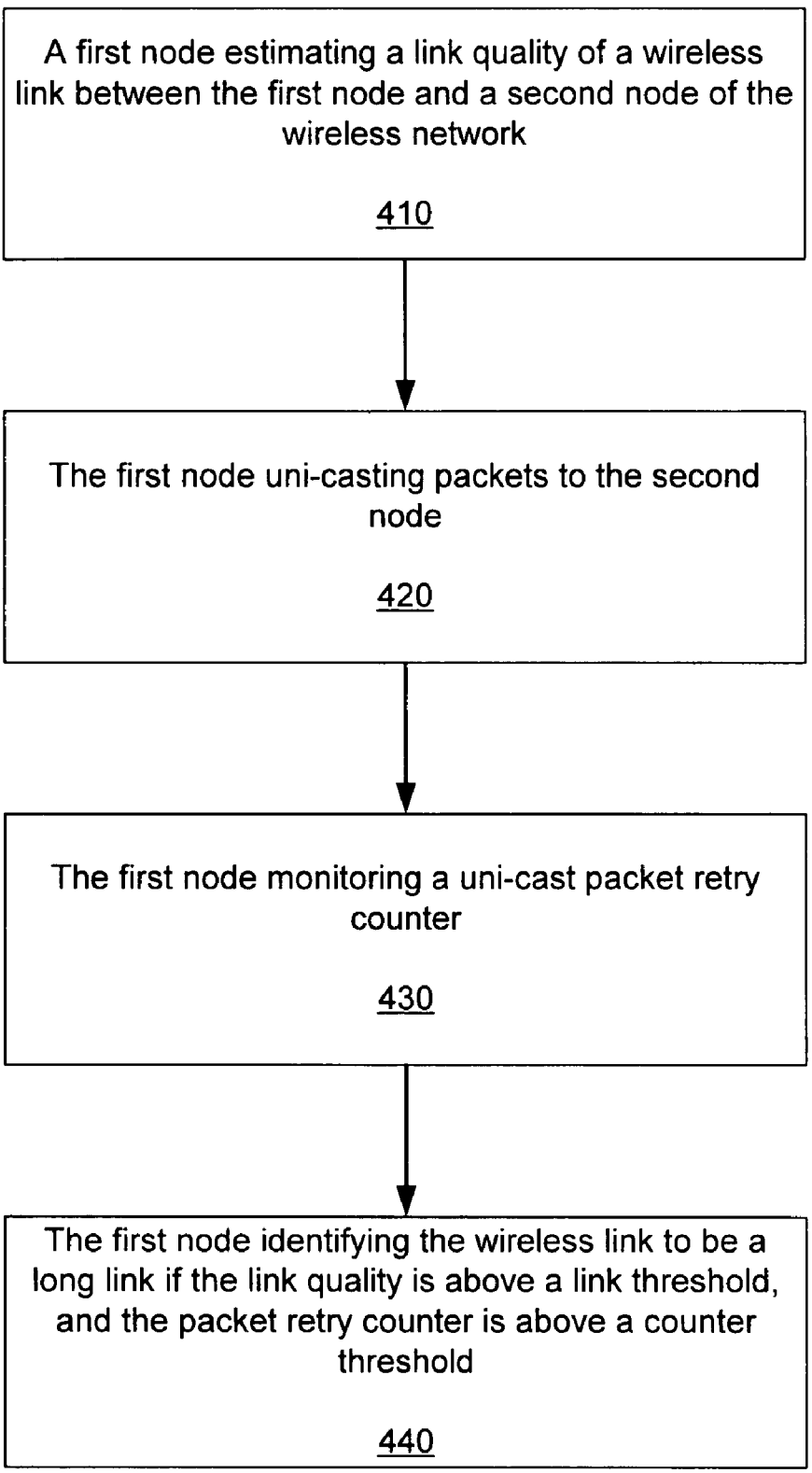
FIG. 4 is a flow chart that includes steps of another example of a method of identifying long links within a wireless network.

FIG. 4 is a flow chart that includes steps of another example of a method of identifying long links within a wireless network. A first step 410 of the method includes a first node estimating a link quality of a wireless link between the first node and a second node of the wireless network. A second step 420 includes the first node uni-casting packets to the second node. A third step 430 includes the first node monitoring a uni-cast packet retry counter. A fourth step 440 includes the first node identifying the wireless link to be a long link if the link quality is above a link threshold, and the packet retry counter is above a counter threshold.

As previously described, a preset retry counter can be 16-32 retries. The retry counter counts how many times a uni-cast packet is sent if an acknowledgment is not received.

At some point, the value of the number of retries is capped, suggesting that the link is either of poor quality, or a long link. As previously described, if another method of determining link quality is available, a determination can be made whether the link is a long link.

Figure 5:
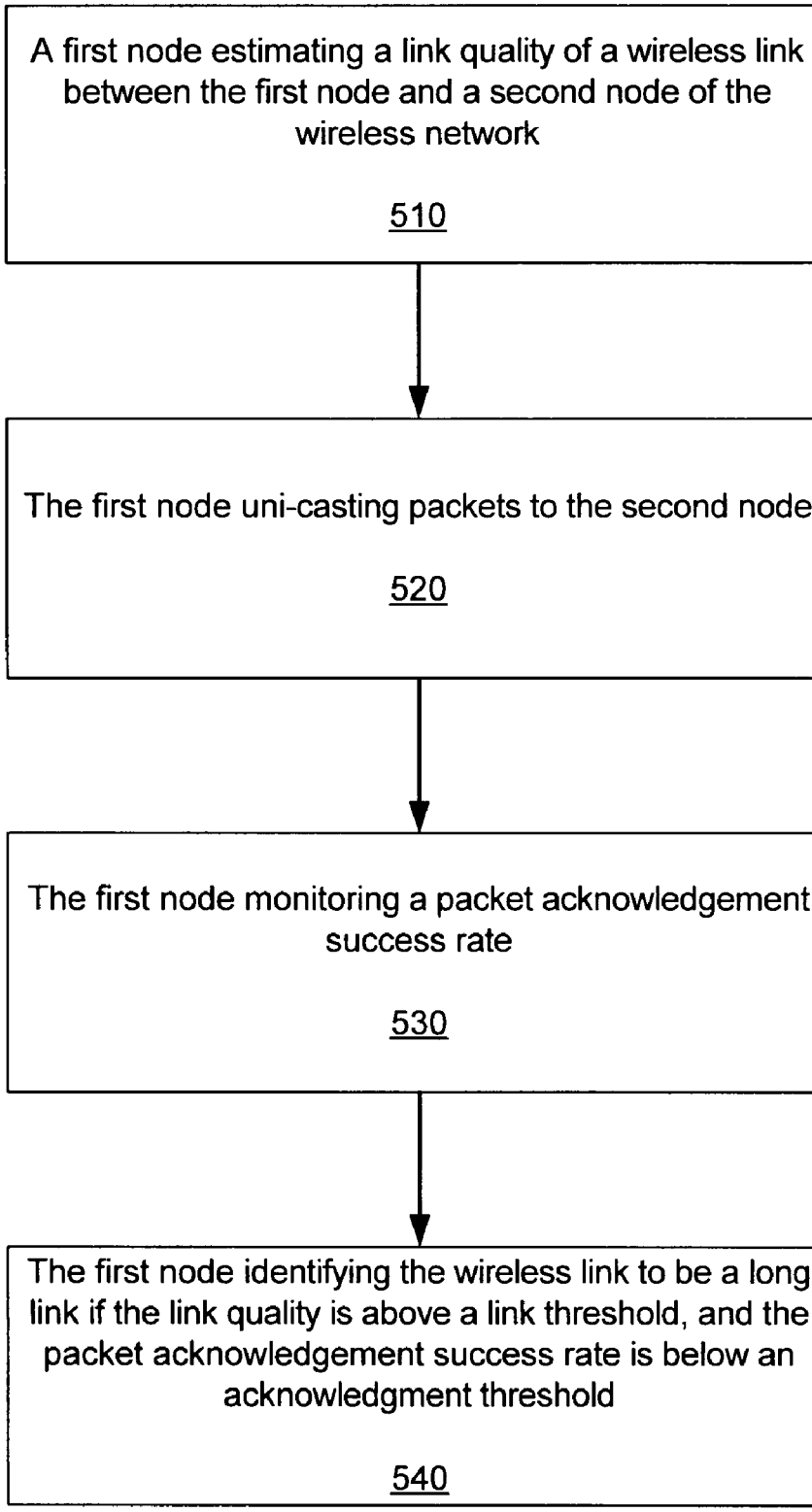
FIG. 5 is a flow chart that includes steps of another example of a method of identifying long links within a wireless network.

FIG. 5 is a flow chart that includes steps of another example of a method of identifying long links within a wireless network. A first step 510 of the method includes a first access node estimating a link quality of a wireless link between the first node and an upstream access node of the wireless mesh network. A second step 520 includes the first node uni-casting packets to the upstream node. A third step 530 includes the first node monitoring a packet acknowledgment success rate. A fourth step 540 includes the first node identifying the wireless link to be a long link if the link quality is above a link threshold, and the packet acknowledgment success rate is below an acknowledgment threshold.

As has been described, once a link has been identified as a long link, routing selections through the wireless mesh network an either avoid the link, or preferentially select routing paths that do not include a long link.

Although specific embodiments of the invention have been described and illustrated, the invention is not to be limited to the specific forms or arrangements of parts so described and illustrated. The invention is limited only by the appended claims.

What is claimed:

1. A method of identifying long links within a wireless network, comprising:
   a first node estimating a link quality of a wireless link between the first node and a second node of the wireless network;
   the first node uni-casting packets to the second node;
   the first node monitoring a packet acknowledgment success rate;
   the first node identifying the wireless link to be a long link if the link quality is above a link threshold, and the packet acknowledgment success rate is below an acknowledgment threshold.

2. The method of claim 1, wherein the first node is a downstream device, and the second node is an upstream node.

3. The method of claim 1, further comprising the first node avoiding a wireless connection with the second node if the wireless link is identified as a long link.

4. The method of claim 1, wherein the first node preferentially selects a wireless connection to the wireless network through a wireless link that is not designated as a long link.

5. The method of claim 1, wherein the wireless network is a wireless mesh network, the first node is a downstream node, and the second node is an upstream device, wherein the upstream device is at least one of an access node or a gateway.

6. The method of claim 5, wherein the first node selects a routing path to a gateway of the wireless mesh network.

7. The method of claim 6, wherein the first node selecting a routing path comprises the first node analyzing link qualities of upstream links.

8. The method of claim 7, wherein the link qualities analyzed comprises at least one of downstream routing packet success rate, upstream packet success rate and whether the upstream link is designated as a long link.

9. The method of claim 7, wherein the first node selects a routing path based at least in part on whether the upstream link is designated as a long link.

10. The method of claim 1, wherein if the wireless link is identified as a long link, then the first node dynamically increases an acknowledgment timeout value.

11. The method of claim 10, further comprising the first node notifying the second node to increase the acknowledgment timeout value.

12. The method of claim 10, wherein dynamically increasing the acknowledgment timeout value comprises:
    increasing the timeout value;
    monitoring the packet acknowledgment success rate;
    additionally increasing the timeout value of the packet acknowledgment success rate remains below the acknowledgment threshold.

13. The method of claim 12, wherein the time out value cannot exceed a predetermined timeout value cap.

14. The method of claim 13, wherein if the timeout value cap is exceeded, then the wireless link is identified as a long link, and the acknowledgment timeout value is reset back to a default value.

15. The method of claim 1, further comprising decreasing the acknowledgment timeout value.

16. A method of identifying long links within a wireless network, comprising:
    a first node estimating a link quality of a wireless link between the first node and a second node of the wireless network;
    the first node uni-casting packets to the second node;
    the first node monitoring a uni-cast packet retry counter;
    the first node identifying the wireless link to be a long link if the link quality is above a link threshold, and the packet retry counter is above a counter threshold.

17. A method of identifying long links within a wireless mesh network, comprising:
    a first access node estimating a link quality of a wireless link between the first node and an upstream access node of the wireless mesh network;
    the first node uni-casting packets to the upstream node;
    the first node monitoring a packet acknowledgment success rate;
    the first node identifying the wireless link to be a long link if the link quality is above a link threshold, and the packet acknowledgment success rate is below an acknowledgment threshold.

18. The method of claim 17, further comprising the first access node selecting a routing path to an upstream gateway comprising:
    the first access node analyzing qualities of links of routing paths between the first access node and at least one upstream gateway;
    the first access node selecting a routing path based on the link qualities, at least one of the link qualities being whether upstream link are designated as long links.

19. The method of claim 18, wherein an upstream routing path that includes a link that is designated as a long link is preferentially not selected.

20. The method of claim 18, wherein an upstream routing path that includes a link that is designated as a long link is not selected.

21. The method of claim 18, wherein the link qualities analyzed comprises at least one of downstream routing packet success rate, upstream packet success rate and whether the upstream link is designated as a long link.

\* \* \* \* \*